United States Patent [19]
Lo et al.

[11] Patent Number: 5,940,392
[45] Date of Patent: Aug. 17, 1999

[54] PROGRAMMABLE ADDRESS MAPPING MATRIX FOR SECURE NETWORKS

[75] Inventors: William Lo, Santa Clara; Ian Crayford, San Jose, both of Calif.

[73] Assignee: Advanced Micro Devices, Inc., Sunnyvale, Calif.

[21] Appl. No.: 08/366,809

[22] Filed: Dec. 30, 1994

[51] Int. Cl.$^6$ ................................. H04J 3/26; H04J 3/36
[52] U.S. Cl. ........................................... 370/392; 370/401
[58] Field of Search .......................... 370/60, 60.1, 94.1, 370/94.2, 94.3, 85.13, 91, 92, 93, 85, 6, 75, 76, 97, 315, 379, 428, 412, 429, 395, 401, 392, 50, 246, 252, 521, 525, 432, 389, 293, 471; 340/825.5, 825.51, 825.52, 825.02, 825.03, 825.01; 395/200, 400, 425, 725, 183.19, 182.02, 185.02, 186; 455/11.1; 380/38, 49, 50, 29, 23, 4, 25, 9.6, 3; 342/64; 371/20.1

[56] References Cited

U.S. PATENT DOCUMENTS

| | | |
|---|---|---|
| 4,680,755 | 7/1987 | Reames . |
| 4,843,542 | 6/1989 | Dashiell et al. ........................ 364/200 |
| 4,901,348 | 2/1990 | Nichols et al. . |
| 5,063,562 | 11/1991 | Barzilai et al. ........................ 370/94.1 |
| 5,099,517 | 3/1992 | Gupta et al. . |
| 5,161,192 | 11/1992 | Carter et al. . |
| 5,177,788 | 1/1993 | Schanning et al. . |
| 5,179,554 | 1/1993 | Lomicka et al. . |
| 5,251,203 | 10/1993 | Thompson . |
| 5,353,353 | 10/1994 | VIjeh et al. ............................... 380/29 |
| 5,430,715 | 7/1995 | Corbalio et al. ....................... 370/94.1 |
| 5,436,617 | 7/1995 | Adams et al. ....................... 340/825.5 |

FOREIGN PATENT DOCUMENTS

WO 92/17963  10/1992  WIPO .

OTHER PUBLICATIONS

"Lecture Notes In Computer Science," Edited by Goos, G. and Hartmanis, J., "Local Area Network Security," Edited by Berson, T.A. and Beth, T., Workshop LANSEC '89, E.I.S.S. Karlsruhe, FRG, Apr. 3–6, 1989, pp. 31–52.

"Information technology –Local and metropolitan area networks –Part 3: Carrier sense multiple access with collision detection (CSMA/CD) access method and physical layer specifications," ISO/ IEC 8802–3, ANSI/IEEE Std. 802.3, Fourth edition, 1993-07–08. (front page only).

*Primary Examiner*—Dang Ton
*Attorney, Agent, or Firm*—Townsend and Townsend and Crew LLP

[57] ABSTRACT

In a repeater having multiple ports and receiving at a source port a data packet containing a received address, an address mapping system including a content addressable memory (CAM) with address registers containing stored addresses, and an address mapping matrix coupled to said CAM, for perfectly mapping any of the address registers to any of the ports. According to one aspect of the invention, it operates in a repeater having an address compare and disrupt security system. The preferred embodiment of the present invention includes a content addressable memory having address registers containing stored individual and multicast addresses associated with each repeater port, and an address mapping matrix including a disrupt enable circuit associated with each port, for enabling the disruption of the data packet at that port when the received destination address does not match the associated stored addresses, and for disabling the disruption of the data packet at that port when the received destination address matches the stored address in a particular register and that particular register is mapped to that port via an address mapping register.

19 Claims, 4 Drawing Sheets

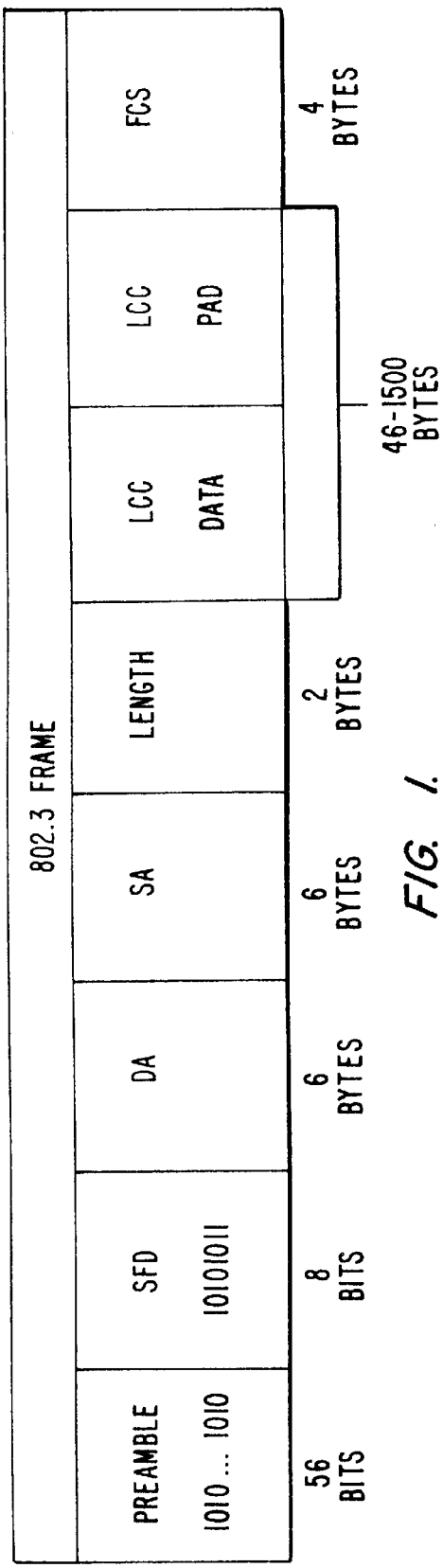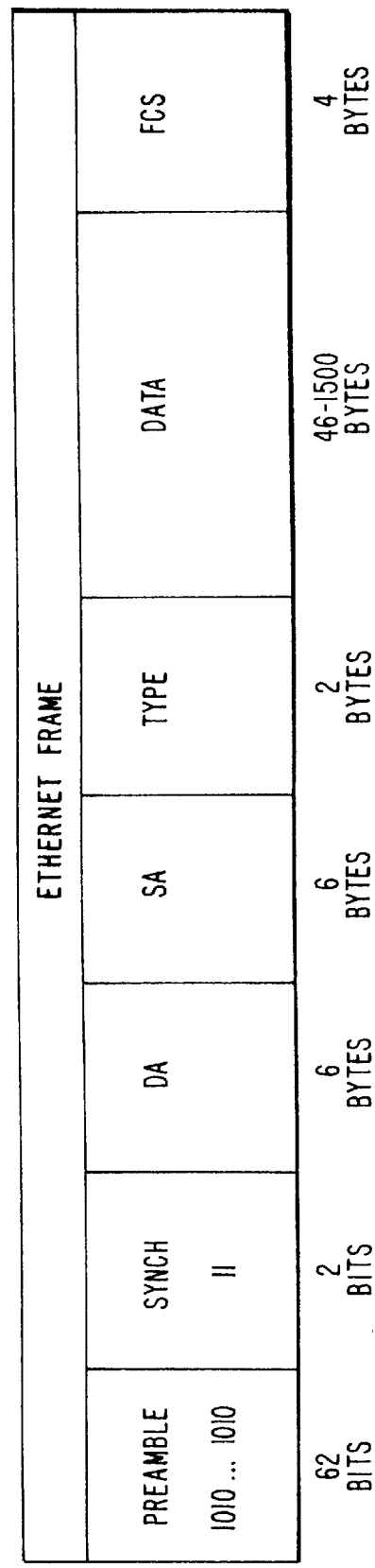

PROGRAMMABLE ADDRESS MAPPING MATRIX FOR SECURE NETWORKS

CROSS-REFERENCE TO RELATED APPLICATIONS

This application is related to "Address Tracking Over Repeater Based Networks", U.S. Pat. No. 5,353,353 issued on Oct. 10, 1994, "Repeater Security System," U.S. patent application 08/053,797 filed Apr. 26, 1993, now U.S. Pat. No. 5,353,353 patent application 08/337,634 filed Nov. 10, 1994, now U.S. Pat. No. 5,590,201 patent application for "Programmable Delay of Disrupt for Secure Networks," filed Dec. 30, 1994 (serial no. unknown), and U.S. patent application for "Programmable Disrupt of Multicast Packets for Secure Networks," filed Dec. 30, 1994, Ser. No. 08/366, 806 now Pat. No. 5,539,739, all hereby expressly incorporated by reference for all purposes.

BACKGROUND OF THE INVENTION

The present invention relates generally to data packet security within a local area network and more specifically to an address mapping matrix for improved security within a network that uses multi-port repeaters.

Networks of computers are commonly used in today's business environment. One common network system structure uses one or more repeaters. The repeater typically includes several ports. A particular data packet received at one port is retransmitted from the other ports of the repeater. Each repeater restores timing and amplitude degradation of data packets received on one port and retransmits them to all other ports, and hence over the network. For networks employing a CSMA/CD-type of network, such as an Ethernet network, every data packet passes through every repeater. Network administrators are thereby able to conveniently use each repeater as a device on the network from which to gather information concerning the operation of the network.

In traditional Ethernet (802.3 10BASE5) and Cheapernet (802.3 10BASE2), a coaxial cable provides a linear bus to which all nodes of a local area network are connected. A standard promulgated by the IEEE (IEEE Standard 802.3) defines various functionality for computer networks. This standard is expressly incorporated by reference for all purposes. Signaling is accomplished using a current synch technique wherein a center conductor of the coaxial cable is used for a signal and a shield conductor of the coaxial cable is used for a reference voltage (typically ground). Twisted pair Ethernet (802.3 10BASE-T) uses a standard voice grade telephone cable rather than the coaxial cable. The telephone cable uses separate pairs of conductive wires for transmission and reception.

When using twisted pair Ethernet, the network configuration is a star topology. The star topology provides for several end stations or data terminal equipment (DTE) devices all coupled to a multi-port repeater located at a center of the star. The repeater performs signal amplitude and timing restoration. The repeater receives a bitstream at one of its ports and restores signal amplitude levels and timing requirements. The repeater repeats the reshaped and retimed input bitstream to all of its other ports. In one sense, the repeater acts as a logical coaxial cable, permitting every node connected to the twisted pair network to receive each transmission from any other node, just as when a coaxial cable is used. The pairs of conductors use differential signaling, one pair for transmission and another pair for reception.

While a repeater is used in a traditionally wired coaxial Ethernet network as a mechanism to extend the physical distance limit of the network, in the IEEE 802.3 10BASE-T, the standard mandates the use of a repeater to provide connectivity between nodes whenever more than two nodes are present. Although physical signaling on the cabling differs between the traditional Ethernet-type of repeater and the twisted pair-type of repeater, the functionality of the repeaters are identical, as is a frame or packet format that is used to pass messages between the participating nodes on the network.

The frame commences with a preamble sequence which is an alternating ("1" and "0") pattern. The preamble sequence provides a single frequency on the network, in this case five MegaHertz (MHz) at the start of each frame, allowing a receiver to acquire and lock onto the associated bitstream. The preamble sequence is followed by a start of packet identifier that immediately precedes the data portion of the transmission. Either a start of frame delimiter (802.3) or synch sequence (Ethernet) delineates the start of the data portion of the message. Following the start of packet identifier are two address fields: a destination address (DA) and a source address (SA). These addresses are both forty-eight bit values and are transmitted least significant bit (LSB) first.

A media access controller (MAC) associated with each DTE uses the destination address to determine whether an incoming packet is addressed to the node it is associated with. When a receiving node detects a match between its own node address and an address transmitted in the destination address field, it attempts to receive the packet. Nodes having a MAC that does not detect a matching address typically ignore a remainder of the packet.

There are three types of destination addressing supported by the 802.3 standards:

1. Individual. The DA field contains an individual and unique address assigned to a single node on the network.
2. Multicast. When the first bit (LSB) of the DA is set, the remainder of the DA includes a group address. The group of nodes that are actually addressed is determined by a higher layer function. In general, use of a group address is designed to transmit a message to a logically similar subset of nodes on the network.
3. Broadcast. The broadcast is a special form of multicast address wherein the DA field is set to all "1"s. This address is reserved, and all nodes on the network must be capable of receiving a broadcast message.

The MAC that transmits a data packet writes its own address into the SA field. This allows the transmitting MAC to identify those packets which it originates. The 802.3 standards do not require that a receiving MAC take any action based upon the SA field. In some applications, such as management, security or configuration, the SA field may be tracked and monitored.

A two-byte length/type field follows the SA field. The choice of length or type is dependent upon whether the frame is compatible with the IEEE 802.3 or the Ethernet standard. A higher order byte of the length/type field is transmitted first, with the LSB of each byte transmitted first.

A data field contains actual packet data that is transferred between end stations and is between forty-six to fifteen hundred bytes in length. A logical link control (LLC) function is responsible for fragmenting data into block sizes suitable for transmission over the network. Data bytes are transmitted sequentially with the LSB of each byte transmitted first.

A frame check sequence (FCS) is a four-byte field that contains a cyclic redundancy check (CRC) for the entire frame. The transmitting station computes the CRC throughout the DA, the SA, the length/type field, and data field. The transmitting station appends the FCS as the last four bytes of the frame. A receiving station uses the same CRC algorithm to compute the CRC for a received frame. The receiving station compares the CRC value it computes with the CRC value in the transmitted FCS. A mismatch indicates an error, such as a corrupted data frame. CRC bits of the FCS are transmitted in order: most significant bit (MSB) to LSB.

FIG. 1 and FIG. 2 are diagrams illustrating frame formats for an IEEE 802.3 Standard compliant frame and an Ethernet frame, respectively. Comparing the frame formats illustrates that a primary difference between the frame types is that the start of frame delimiter (SFD) for 802.3 is defined as a byte that has a "1 0 1 0 1 0 1 1" pattern whereas the start frame (synch) of Ethernet is a "11" sequence. Even so, in both cases, a total number of bits for the preamble plus the start of frame indication is sixty-four bits long.

The 802.3 and Ethernet standards both specify that a frame must be in the range of sixty-four to fifteen hundred eighteen bytes (excluding preamble/SFD). However, the actual data field in the 802.3 system is permitted to be smaller than the forty-six byte value that is necessary to ensure this minimum size. To handle a smaller size data field, the MAC of a transmitting station appends pad characters to the LLC data field before sending data over the network. The Ethernet standard assumes that an upper layer ensures that the minimum data field is forty-six bytes before passing data to the MAC, therefore the existence of appended pad characters is unknown to the MAC implementing an Ethernet format.

The 802.3 standard also uses a length field that indicates the number of data bytes that are in the data field only. Ethernet, on the other hand, uses a type field in the same two bytes to identify the message protocol type. Since valid Ethernet type fields are always assigned outside of the valid maximum 802.3 packet length size, both 802.3 and Ethernet packets can coexist on the same network. Hence, it has been found that it is important to be able to track and monitor the addresses for a variety of reasons. For example, for secure networks it may be important that authentication is required to ensure that the appropriate nodes on the network receive the information. In addition, as networks change in the number of nodes attached thereto, it becomes important to be able to associate an address with a particular port or the like within the network.

It is also important in secure networks to prevent a node from receiving such address and/or packet information. One preferred way to implement security features is to use a secure repeater.

Further, it is important to provide a mechanism to associate the addresses of each port of a repeater with the actual port number or identity of the device. Typically, conventional repeaters have been devices that are just used for signal amplitude and timing restoration. In all of the above-mentioned modes, the secure repeater must also be provided with the capability to detect and interpret the various fields within data packets transmitted on the network.

Every data packet transmitted in the computer network includes a destination address to identify the recipient of the data packet. A secure repeater in a secure network may have one or more end stations attached to each port. Each end station typically has one unique, individual address assigned, and possibly one or more multicast addresses. The secure repeater maintains a list of associated end station addresses for each output port.

The security systems identified in the incorporated references use the destination address field from each data packet to route a data packet to only those output ports associated with the destination address. Output ports of the secure repeater associated with a destination address not matching the destination address receive a modified, or disrupted, data packet.

The security system functions well for data packets addressed using the individual addresses. The security systems in the prior art maintained a list of individual addresses of the associated end stations for each output port, by storing only one address (the individual address) per port.

One potential drawback is that a port could correspond to not only one individual address but also possibly multiple individual addresses or one or more multicast addresses. Therefore, the security systems of the prior art are limited to comparing a received address at a port to the stored individual addresses. When these systems encounter a "0" as the first bit (LSB) of a received address at a port, indicating that the received address is an individual address, the security system would operate well. However, upon encountering a "1" as the first bit (LSB) of a received address at a port, indicating the received address is a multicast address, the security system would merely pass the received data packet unmodified to all of the ports. Messages sent to targeted DTEs sharing a particular multicast address would not be disrupted at any ports, and thus non-targeted DTES could potentially eavesdrop, leading to a security breach.

Other security exposures may arise when the security system passes data packets having multicast addresses to all ports without disruption. For instance, an intruder could disconnect (or mimic) an authorized DTE, having an address that was stored previously in the secure repeater. The substitute device could be plugged into the repeater port previously used by the authorized DTE (which may or may not be disconnected). By sending a data packet with a multicast address in the destination address field, the intruder obtains a defined source address (either because the repeater updates the source address at ports having a received source address different from a stored address associated with that port, or because the intruder mimics a source address already stored in the repeater). The intruder then receives data packets that are not intended for the intruder or that are intended for the mimicked DTE.

Special procedures are required in order to deal with the multicast packets. If multicast addresses are used on the network, more than one register may be needed to store the end station addresses for each port. Ideally, a secure repeater would have enough registers to store multiple addresses (corresponding to all the individual as well as possibly several multicast addresses) per port, and thereby be able to compare any received destination address (individual or multicast) to the stored addresses for each port in order to disrupt data packets to non-targeted DTEs. Since a 48-bit register is required to store each address, adding a register for each additional address for each port would be relatively expensive and inefficient.

SUMMARY OF THE INVENTION

The present invention provides a mechanism for enhancing security in networks with repeaters. The invention has various advantages over the prior art, including providing multiple addresses per port and a more efficient and economical solution to the difficulties that multicast addresses pose to network security. The solution does not require large and expensive amounts of excess address registers to accommodate additional individual addresses and/or multicast addresses for each port in the repeater.

According to one aspect of the invention, in a repeater having multiple ports and receiving at a source port a data packet containing a received address, there is an address mapping system that includes a content addressable memory (CAM) with address registers storing stored addresses, and an address mapping matrix coupled to the CAM, for perfectly mapping any of the address registers to any of the ports.

According to one aspect of the invention, it operates in a repeater having an address compare and disrupt security system. The preferred embodiment of the present invention includes a content addressable memory having address registers containing stored individual and multicast addresses associated with each repeater port, and an address mapping matrix including a disrupt enable circuit associated with each port, for enabling the disruption of the data packet at that port when the received destination address does not match the associated stored addresses, and for disabling the disruption of the data packet at that port when the received destination address matches the stored address in a particular register and that particular register is mapped to that port via an address mapping register.

The address mapping matrix provides improved security in a network having destination address comparing and disrupting by allowing the administrator to map any register containing a stored address to any port, regardless of whether the stored address is individual or multicast. Each address mapping register is externally programmable, and an administrator maps address registers to ports with great flexibility. The present invention allows the administrator to map any register to any port, and provides an enhancement to security systems having destination address comparing and data packet disruption, by extending security to multicast addresses as well as individual addresses.

A further understanding of the nature and advantages of the invention may be realized by reference to the remaining portions of the specification and the drawings.

BRIEF DESCRIPTION OF THE DRAWINGS

FIG. 1 is a diagram illustrating a frame format for an IEEE 802.3 Standard compliant frame;

FIG. 2 is a diagram illustrating a frame format for an Ethernet frame;

DESCRIPTION OF THE PREFERRED EMBODIMENT

Figure 3:
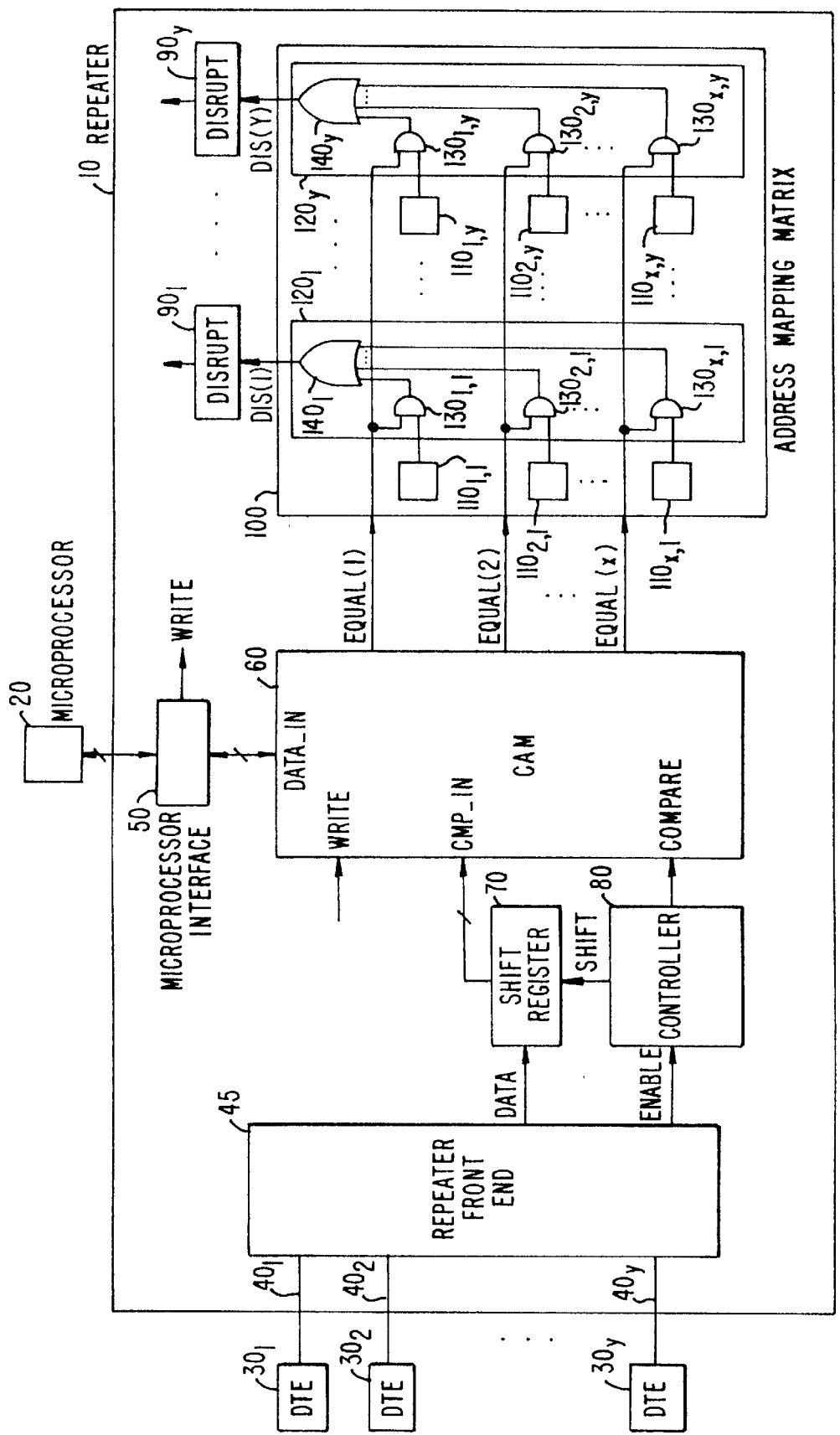
FIG. 3 is a block diagram of a repeater in accordance with the preferred embodiment of the present invention.

FIG. 3 is a block diagram of a repeater 10 coupled to a microprocessor 20 or other controller and a plurality of data terminal equipment (DTE) $30_n$, (n=1 to y). Repeater 10 includes a plurality of ports $40_n$, (n=1 to y), a repeater front end 45, a microprocessor interface 50, a content addressable memory (CAM) 60, a shift register 70, a controller 80, a plurality of disrupt circuits $90_n$ (n=1 to y), and an address mapping matrix 100.

A plurality of DTE $30_n$ connect to repeater 10 via a plurality of ports $40_n$. On power up, repeater 10, if it has address learn capability and that capability is enabled, learns each individual MAC address of a DTE $30^n$ on connected at port $40_n$. Those addresses are stored in address registers in CAM 60.

CAM 60 includes a plurality of 48-bit address registers ADR(m) (not shown), (m=1 to x, where x is greater than y). An address register ADR(m) stores either an individual or multicast address that may be learned or programmed.

Microprocessor 20 optionally is able to program addresses (individual or multicast) into address registers ADR(m) in CAM 60 at DATA_IN input, via microprocessor interface 50 by asserting a WRITE signal. Additional details of the operation of CAM 60 and its programming features are disclosed in the incorporated references.

Repeater front end 45 is coupled to ports $40_n$, shift register 70, and controller 80. Repeater front end 45 receives a data packet from DTE $30_1$ at port $40_1$. Upon receiving the data packet, repeater front end 45 transmits the entire data packet in a serial bitstream, referred to as the DATA signal, to shift register 70. Repeater front end 45 also asserts an ENABLE signal to controller 80 to indicate when data in the DATA signal is valid.

As seen in FIG. 1 and FIG. 2, a data packet compliant with either the 802.3 or Ethernet standards includes 64 bits for the preamble and start of frame indication, followed by the 48-bit destination address field. In the preferred embodiment of a security system, the destination address field in the DATA signal is used to determine whether to disrupt a data pocket. In these situations, repeater front end 45 asserts the ENABLE signal until the entire destination address field of the data packet is loaded into shift register 70 (until 48 bits beyond the start of frame indication have been received). Thus, the destination address field is extracted from the DATA signal.

Controller 80, responsive to the ENABLE signal from repeater front end 45, asserts a SHIFT signal to shift register 70. The SHIFT signal controls storage of the destination address contained in the destination address field of the received frame into shift register 70. Upon deasserting the SHIFT signal (thereby locking in the destination address in shift register 70), controller 80 asserts a COMPARE signal to CAM 60 to initiate a compare procedure.

Responsive to assertion of the SHIFT signal, shift register 70, which is 48-bits wide, shifts in each bit of the DATA signal until the received destination address is stored and the SHIFT signal is deasserted.

Responsive to an assertion of the COMPARE signal, CAM 60 compares the received destination address from shift register 70 at CMP_IN with every stored address stored in address registers ADR(m) of CAM 60. In the preferred embodiment, CAM 60 includes address registers ADR(n) for storing individual addresses associated with ports $40_n$, as well as a pool of multiple address registers ADR(m) for storing additional individual addresses and/or multicast addresses shared by more than one port $40_n$.

After comparing the received destination address with the stored addresses, CAM 60 asserts an EQUAL(m) signal HIGH when the received destination address at CMP_IN input matches any stored address, whether individual or multicast, contained in address registers ADR(m), and asserts an EQUAL(m) signal LOW to indicate no match. CAM 60 has a plurality of EQUAL(m) signals, one corresponding to each address register ADR(m). For example, if the received destination address in the data packet at port $40_1$ matches the individual MAC address stored in address register ADR(2), CAM 60 asserts the EQUAL(2) signal HIGH. If the received destination address in the data packet at port $40_1$ matches a multicast address stored in address register ADR(12), then CAM 60 asserts the EQUAL(12) signal HIGH. More than one EQUAL(m) signal may be asserted HIGH at any given time, depending upon the results of the compare procedure Address mapping matrix 100 receives the plurality of EQUAL(m) signals from CAM 60. Address mapping matrix 100 includes a plurality of address mapping registers $110_{m,n}$, for a particular address register ADR(m) and a particular port $40_n$, and a plurality of disrupt enable circuits $120_n$, one for each port $40_n$. Address mapping registers $110_{m,n}$, associated with port $40_n$ are coupled to disrupt enable circuit $120_n$.

Each disrupt enable circuit $120_n$ includes an OR gate $140_n$ and a plurality of AND gates $130_{m,n}$. Each AND gate $130_{m,n}$ includes an input coupled to a corresponding address mapping register $110_{m,n}$, and an input coupled to receive an EQUAL(m) signal from CAM 60. An output of each AND gate $130_{m,n}$ in disrupt enable circuit $120_n$ is coupled to an input of OR gate $140_n$. OR gate $40_n$ outputs a DIS(n) signal.

Address mapping registers $110_{m,n}$ are programmable to perfectly map address register ADR(m) to a port $40_n$ by storing a bit value HIGH to indicate mapping or LOW to indicate no mapping.

Each disrupt enable circuit $120_n$ in address mapping matrix 100 generates a DIS(n) signal for use by a corresponding disrupt circuit $90_n$ to indicate whether to disrupt the retransmitted data packet at the associated port $40_n$.

Repeater 10 also includes a plurality of disrupt circuits $90_n$, one for each port $40_n$. Each disrupt circuit $90_n$, responsive to the DIS(n) signal from address mapping matrix 100, disrupts the retransmitted data packet at port $40_n$. Specific details regarding the operation and implementation of the above described disrupt circuits are further discussed in the incorporated U.S. patent application Ser. No. 08/053,797.

When address register ADR(m) is programmed to map to port $40_n$ and CAM 60 asserts an EQUAL(m) signal HIGH, disrupt enable circuit $120_n$ asserts a DIS(n) signal HIGH to disable disrupt circuit $90_n$ from disrupting the retransmitted data packet at port $40_n$. If address register ADR(m) is programmed to map to port $40_n$ and CAM 60 asserts an EQUAL(m) signal LOW, disrupt enable circuit $120_n$ asserts a DIS(n) signal LOW to enable disrupt circuit $90_n$ to disrupt the retransmitted data packet at port $40_n$. If address register ADR(m) is programmed not to map to port $40_n$, disrupt enable circuit $120_n$ asserts a DIS(n) signal LOW to enable disrupt circuit $90_n$ to disrupt the retransmitted data packet at port $40_n$ regardless of whether CAM 60 asserts an EQUAL (m) signal HIGH or LOW.

Depending on how address mapping registers $110_{m,n}$ are programmed, an address register ADR(m) may be mapped to one port $40_n$ (indicating the address register contains an individual address), to none of the ports $40_n$ (indicating that the address register is empty and not in use), or to two or more of the ports $40_n$ (indicating the address register contains a multicast address). Similarly, address mapping registers $110_{m,n}$ are programmable so that any port $40_X$ may be mapped to zero, one, or to two or more address registers. Thus, address mapping matrix 100 provides flexibility in mapping any register to any port $40_n$, or to an arbitrary combination or ports $40_x$, with one advantage being the capability to support multiple individual addresses for any port, and a further advantage being the capability to store multicast addresses mapped to appropriate ports $40_n$.

Figure 4:
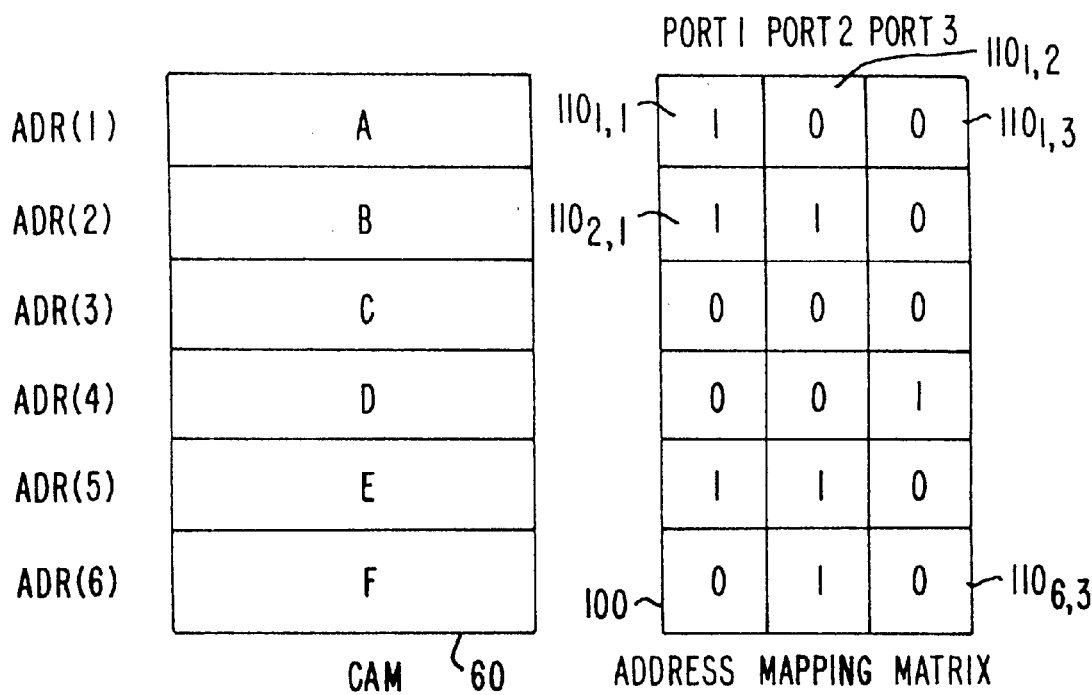
FIG. 4 is a diagram illustrating the operation of the present invention.

FIG. 4 provides an illustration of how CAM 60 and address mapping matrix 100 operate. This example assumes that CAM 60 includes six address registers ADR(m), and repeater 10 includes three ports $40_n$ (n=1–3), three disrupt enable circuits $120_n$, and eighteen address mapping registers $110_{m,n}$. Address registers ADR(1) to ADR(6) contain addresses A to F, respectively.

As seen in FIG. 4, any address register ADR(m) may be mapped to any port $40_n$ through the associated address mapping register $110_{m,n}$. For instance, address mapping register $110_{1,1}$ is set HIGH to indicate that ADR(1) is mapped to port $40_1$; address mapping register $110_{1,2}$ is set LOW to indicate that ADR(1) is not mapped to port $40_2$; address mapping register $110_{1,3}$ is set LOW to indicate that ADR(1) is not mapped to port $40_3$. As ADR(l) is mapped only to port $40_1$, ADR(1) contains an individual address A.

Similarly, ADR(4) which is mapped only to port $40_3$ contains an individual address D, and ADR(6) which is mapped only to port $40_2$ contains an individual address F. In the preferred embodiment, individual addresses are mapped to a single port and multicast addresses are mapped to two or more ports. In some embodiments, it may be desirable to map an individual address to multiple ports, and a multicast address to less than two ports. The architecture of the preferred embodiment allows such mapping.

When address mapping registers $110_{m,n}$ maps an address register ADR(m) to more than one port $40_n$, that address ADR(m) is a multicast address. Since address register ADR (2) is mapped to port $40_1$ and port $40_2$, ADR(2) contains a multicast address B. Likewise, ADR(5) contains a multicast address E.

Address mapping matrix 100 provides an advantage when integrated into network security systems having destination address comparing and disrupting. For the values programmed into address mapping registers $110_{m,n}$ in address mapping matrix 100, port $40_1$ will not be disrupted if the received destination address equals A, B, or E. Similarly, port $40_2$ will not be disrupted if the received destination address equals B, E, or F. Port $40_3$ will not be disrupted if the received destination address equals D. All three ports $40_n$, however, will be disrupted if the received destination address equals C, since ADR(3) containing address C is programmed not to map to any of the ports $40_n$.

Figure 5:
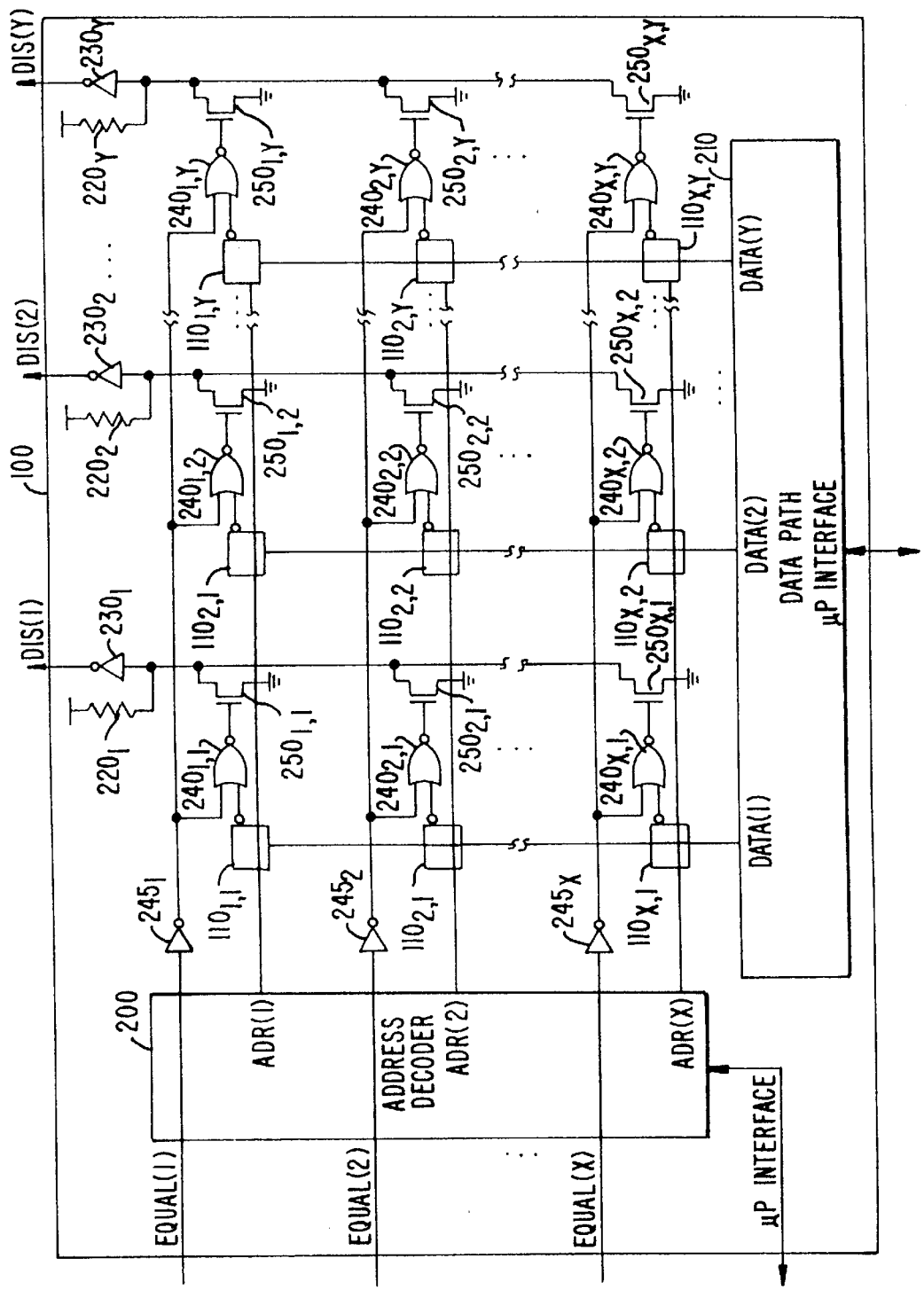
FIG. 5 is a detailed schematic diagram of a preferred implementation of an address mapping matrix.

FIG. 5 is a detailed schematic of a preferred implementation of one embodiment of address mapping matrix 100. The preferred implementation of address mapping matrix 100 includes an address decoder 200, a data path 210, a plurality of address mapping registers $110_{m,n}$, a plurality of pull-up resistors $220_n$, a first plurality of inverters $230_n$, a plurality of NOR gates $240_{m,n}$, a second plurality of inverters $245_X$, and a plurality of NMOS transistors $250_{m,n}$.

Each inverter $245_X$ couples EQUAL$_X$, to a first input of each of the plurality NOR gates $240_{x,n}$. Each address mapping register has an output coupled to a second input of NOR gate $240_{m,n}$. There is a "bubble" on the output of address register $110_{m,n}$ connected to the second input of NOR gate $240_{m,n}$. This bubble indicates the output is a complementary output.

Address decoder 200 and data path 210 are coupled to microprocessor interface 50 such that microprocessor 20 can program address mapping registers $110_{m,n}$ with bit values. Address decoder 200 accesses address mapping registers $110_{m,n}$ a row at a time, with data path 210 providing the path for programming bit values into address mapping registers $110_{m,n}$.

In the particular implementation of address mapping matrix 100 shown in FIG. 5, the bit value meanings remain the same. Another implementation of address mapping matrix 100 is possible by replacing in FIG. 5 the plurality of NOR gates $240_{m,n}$ with a plurality of AND gates, removing the plurality of inverters $145_X$, and removing the bubble from the output of address registers $110_{x,y}$.

An advantage of the present invention is that it provides a network administrator with added network security, especially for stations supporting multiple individual addresses and one or more multicast addresses.

According to the present invention, the administrator has total flexibility in mapping any address registers to any port(s) (and vice-versa), so as to disable or enable the disrupt for more comprehensive network security. The administrator can program the address mapping registers in any way desired, on a per port and/or a per register basis.

The perfect mapping of the preferred embodiment allows both vertical and horizontal mapping, or some combination of both vertical and horizontal mapping, as desired. In vertical mapping, any port may be mapped to zero, one, or to two or more address registers. For horizontal mapping, any address register may be mapped to zero, one or to two or more ports. The nature of the stored address, i.e., an individual address or a multicast address, does not limit how it may be mapped, from the hardware perspective. There are, of course, ramifications in operation for multiple mapping. For certain applications, a network administrator may desire to permit one port to receive every data packet, such as when network monitoring is desired. The present invention permits simple, efficient use of address register memory and does not require multiple installation of an address to map a single address to multiple ports.

Other advantages of the present invention include ease of expandability in the size of the CAM and address mapping matrix. From an implementation standpoint, laying out one cell and replicating it to expand for additional ports and/or for additional address registers is relatively simple. The system is pitch-matched for a dense layout.

Although the invention has been described in terms of a preferred embodiment, it will be obvious to those skilled in the art that various alternatives, modifications and equivalents may be made without departing from the invention. For instance, it is a design choice setting address mapping register HIGH to indicate mapping or setting EQUAL(m) signal HIGH to indicate a match, and inverting the meaning of the signals may be done with appropriate, obvious alterations to the preferred embodiment. While the preferred embodiment uses a CAM for storage of network addresses, primarily for reasons of speed of lookup to enable a large number of addresses to be compared quickly such that disruption of an output data stream to non-intended stations occurs as quickly as possible, use of generic address storing and memory lookup implementations may also be applicable, such as when disruption need not occur as early in the packet data stream, or if there a constrained number of addresses. Therefore, the above description should not be taken as limiting the scope of the invention which is defined by the appended claims.

What is claimed is:

1. In a repeater, having a plurality of ports, for receiving at a source port a data packet containing a received address, an address mapping system comprising:

a content addressable memory (CAM), having a plurality of address registers each storing a stored address;

an address mapping matrix, coupled to said CAM, for selectively mapping a particular one of said plurality of address registers to a particular one of the plurality of port; and wherein said CAM compares each said stored address to the received address and asserts an equal signal associated with a matching address register, wherein said matching address stores a stored address matching the received address.

2. The address mapping system of claim 1 wherein a first number of said plurality of address registers is greater than a second number of said plurality of ports.

3. The address mapping system of claim 1 wherein a first number of said plurality of address registers is less than a second number of said plurality of ports.

4. The address mapping system of claim 1 wherein a first number of said plurality of address registers is equal to a second number of said plurality of ports.

5. The address mapping system of claim 2 wherein said plurality of address registers store multicast addresses and individual addresses.

6. The address mapping system of claim 5 wherein each port of the plurality of ports is associated with a first group of said plurality of address registers storing individual addresses, and an address register of a second group of said plurality of address registers storing multicast addresses is mapped to a second particular one of the plurality of ports.

7. The address mapping system of claim 6 wherein the received address is a destination address.

8. The address mapping system of claim 7, wherein each disrupt enable circuit enables a disrupt at said associated port when said associated port is not mapped to any of said plurality of address registers, and wherein each disrupt enable circuit, responsive to an assertion of said equal signal, disables said disrupt at said associated port when said associated port is mapped to said matching address register associated with said equal signal.

9. The address mapping system of claim 8 wherein each of said plurality of address mapping registers is externally programmable.

10. An address mapping system for a secure repeater, having a plurality of output ports, used in a computer network to route a data packet having a destination address, comprising:

a content-addressable memory, including a plurality of address storage registers for storing addresses of data terminal equipment of the computer network wherein said content addressable memory generates a plurality of equal signals, one for each address storage register, with each equal signal indicating when a stored address matches the destination address; and an address mapping matrix, coupled to said content-addressable memory, for selectively mapping a particular one output port of the plurality of output port to any number of plurality of address storage registers.

11. In a repeater, having a plurality of ports, for receiving at a source port a data packet containing a received address, an address mapping system comprising:

an address storing and comparing circuit, having a plurality of address registers each storing a stored address;

an address mapping matrix, coupled to said address storing and comparing circuit, for selectively mapping a particular one of said plurality of address registers to a particular one of the plurality of port; and wherein said address storing and comparing circuit compares each said stored address to the received address and asserts an equal signal associated with a matching address register, wherein said matching address register stores a stored address matching the received address, wherein said address storing and comparing circuit is a content addressable memory.

12. In a repeater, having a plurality of ports, for receiving at a source port a data packet containing a received address, an address mapping system comprising:

a content addressable memory (CAM), having a plurality of address registers each storing a stored address; and an address mapping matrix, coupled to said CAM, for selectively mapping a particular one of said plurality of address registers to a particular one of the plurality of ports, wherein said address mapping matrix comprises:

a plurality of address mapping registers, each address mapping register associated with a particular port of the plurality of ports and a particular address register of said plurality of registers, for storing a plurality of bit values to map said particular address register to said particular port; and a plurality of disrupt enable circuits, each disrupt enable circuit coupled to said plurality of address registers and associated with one of the plurality of ports, for controlling a disrupt of an associated port;

wherein said CAM compares each said stored address to the received address and asserts an equal signal associated with a matching address register, wherein said matching address register stores a stored address matching the received address;

wherein a first number of said plurality of address registers, storing multicast addresses and individual addresses, is greater than a second number of said plurality of ports;

wherein each port of the plurality of ports is associated with a first group of said plurality of address registers storing individual addresses, and an address register of a second group of said plurality of address registers storing multicast addresses is mapped to a second particular one of the plurality of ports;

wherein the received address is a destination address;

wherein each disrupt enable circuit enables a disrupt at said associated port when said associated port is not mapped to any of said plurality of address registers, and wherein each disrupt enable circuit, responsive to an assertion of said equal signal, disables said disrupt at said associated port when said associated port is mapped to said matching address register associated with said equal signal;

wherein each of said plurality of address mapping registers is externally programmable;

wherein each disrupt enable circuit comprises:
  a plurality of mapping circuits, each mapping circuit associated with one of said plurality of address registers and coupled to one of said plurality address mapping registers, each mapping circuit for mapping said particular one address register to said particular one port;
  a pull-up resistor, coupled to each of said plurality of mapping circuits; and
  an inverter, having an inverter input coupled to said pull-up resistor and to each of said plurality of mapping circuits.

13. The address mapping system of claim 12 wherein each mapping circuit comprises:
  a NOR gate, including a first input coupled to an inverted output of said address mapping register, a second input coupled to an output of a second inverter having an input coupled to said equal signal associated with said one address register, and an output; and
  a transistor, including a gate coupled to said output of said inverted input NOR gate, a source coupled to ground, and a drain coupled to said input of said inverter.

14. The address mapping system of claim 12 wherein each mapping circuit comprises:
  an AND gate, including a first input coupled to said address mapping register, a second input coupled to a said equal signal associated with said one address register, and an output; and
  a transistor, including a gate coupled to said output of said AND gate, a source coupled to ground, and a drain coupled to said input of said inverter.

15. The address mapping system of claim 13 wherein said transistor is an NMOS transistor.

16. An address mapping system of claim 13 wherein said transistor is an NMOS transistor.

17. In a repeater, having a plurality of ports, for receiving at a source port a data packet containing a received address, an address mapping system comprising:

a content addressable memory (CAM), having a plurality of address registers each storing a stored address, wherein said CAM compares each said stored address to the received address and asserts an equal signal associated with a matching address register, and wherein said matching address register stores a stored address matching the received address, and wherein said plurality of address registers store multicast addresses and individual addresses; and an address mapping matrix, coupled to said CAM, for selectively mapping a particular one of said plurality of address registers to a particular one of the plurality of ports, wherein said address mapping matrix comprises:
  a plurality of address mapping registers, each address mapping register associated with a particular port of the plurality of ports and a particular address register of said plurality of registers, for storing a plurality of bit values to map said particular address register to said particular port; and
  a plurality of disrupt enable circuits, each disrupt enable circuit coupled to said plurality of address registers and associated with one of the plurality of ports, for controlling a disrupt of an associated port; and wherein a first number of said plurality of address registers is greater than a second number of said plurality of ports;

wherein each port of the plurality of ports is associated with a first group of said plurality of address registers storing individual addresses, and wherein an address register of a second group of said plurality of address registers storing multicast addresses is mapped to a second particular one of the plurality of ports.

18. The address mapping system of claim 17 wherein the received address is a destination address.

19. In a repeater, having a plurality of ports, for receiving at a source port a data packet containing a received address, an address mapping system comprising:

a content addressable memory (CAM), having a plurality of address registers each storing a stored address; and an address mapping matrix, coupled to said CAM, for selectively mapping a particular one of said plurality of address registers to a particular one of the plurality of ports, wherein the data packet is transmitted unmodified from the particular one port and transmission activity is transmitted from all the plurality of ports other than the particular one port concurrent with the transmission of the unmodified data packet from the particular one port.

* * * * *